United States Patent
Santhosh et al.

(10) Patent No.: US 10,679,446 B2
(45) Date of Patent: Jun. 9, 2020

(54) EXTENDED INSTANT GUEST ACCESS USING NEAR FIELD COMMUNICATION TAGS

(71) Applicant: CARRIER CORPORATION, Jupiter, FL (US)

(72) Inventors: Amuduri Santhosh, Telangana (IN); Adam Kuenzi, Silverton, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 15/814,034

(22) Filed: Nov. 15, 2017

(65) Prior Publication Data

US 2019/0088059 A1 Mar. 21, 2019

(30) Foreign Application Priority Data

Sep. 20, 2017 (IN) .............................. 201711033283

(51) Int. Cl.
*H04L 9/32* (2006.01)
*H04L 29/00* (2006.01)
(Continued)

(52) U.S. Cl.
CPC ......... *G07C 9/00904* (2013.01); *G06F 21/33* (2013.01); *G06F 21/35* (2013.01);
(Continued)

(58) Field of Classification Search
CPC ............ G07C 9/00071; G07C 9/00039; G07C 9/00174; G07C 9/00309; G07C 9/00563;
(Continued)

(56) References Cited

U.S. PATENT DOCUMENTS

| 7,306,145 B2 | 12/2007 | Sakai |
| 8,432,262 B2 | 4/2013 | Talty et al. |

(Continued)

FOREIGN PATENT DOCUMENTS

| DE | 102014211839 A1 | 12/2015 |
| EP | 3166088 A1 | 5/2017 |

(Continued)

OTHER PUBLICATIONS

"NFC Everywhere", NXP.com, Released Nov. 2016, https://www.nxp.com/docs/en/brochure/939775017634.pdf (36 pp.).

(Continued)

*Primary Examiner* — Dionne Pendleton
(74) *Attorney, Agent, or Firm* — Cantor Colburn LLP

(57) ABSTRACT

A method of extending user access to a guest in a building space in a building system including at least one of a cloud computing environment and a control device associated with the building system to execute the method. The method includes receiving a request for access to a building space, the request associated with providing access to the building space for the guest, the request including a unique identifier associated with the building space, notifying a user associated with the building space of the request and requesting an authorization to provide the access to the building space, and receiving an authorization from the user associated with permitting the guest access to the building space associated with the unique identifier. The method also includes transmitting the authorization to the guest and permitting access to the building space associated with the unique identifier based on the authorization.

22 Claims, 4 Drawing Sheets

(51) Int. Cl.

| | | |
|---|---|---|
| *H04M 3/00* | (2006.01) | |
| *G07C 9/00* | (2020.01) | |
| *H04W 12/08* | (2009.01) | |
| *H04W 12/00* | (2009.01) | |
| *H04L 29/06* | (2006.01) | |
| *H04L 29/08* | (2006.01) | |
| *G06F 21/45* | (2013.01) | |
| *G06F 21/33* | (2013.01) | |
| *G06F 21/35* | (2013.01) | |
| *H04W 12/06* | (2009.01) | |

(52) U.S. Cl.
CPC ......... *G06F 21/45* (2013.01); *G07C 9/00571* (2013.01); *H04L 9/32* (2013.01); *H04L 9/321* (2013.01); *H04L 9/3268* (2013.01); *H04L 65/10* (2013.01); *H04L 67/02* (2013.01); *H04L 67/125* (2013.01); *H04W 12/00512* (2019.01); *H04W 12/00514* (2019.01); *H04W 12/0609* (2019.01); *H04W 12/08* (2013.01); *H04W 12/0804* (2019.01); *G07C 2009/00793* (2013.01); *H04L 63/083* (2013.01); *H04L 63/0823* (2013.01); *H04L 63/0861* (2013.01); *H04W 12/00407* (2019.01); *H04W 12/06* (2013.01)

(58) Field of Classification Search
CPC ............ G07C 9/00571; G07C 9/00904; G07C 2009/00793; G07C 2009/00365; G07C 2009/00412; G07C 2209/64; G07C 9/00087; G07C 9/00103; E05B 47/0615; E05B 2047/0095; G06Q 10/02; G06Q 50/30; H04W 4/008; H04W 4/80; H04W 12/00407; H04W 12/06; H04W 12/08; H04W 12/0804; H04W 12/003; H04W 12/00503; H04W 12/00522; H04W 12/00514; H04W 12/04; H04L 63/0823; H04L 63/083; H04L 63/0861; H04L 63/0428; H04L 63/0492; H04L 63/08; H04L 9/321; H04L 9/3263; H04L 9/3271; H04L 2209/80; H04L 2209/805; H04L 63/04; H04L 9/14; H04L 9/30; H04L 9/3213; H04L 9/3226; H04L 9/3247; H04L 9/3265; H04M 1/72533; G06F 21/33; G06F 21/335; G06F 21/36; G06F 21/45
See application file for complete search history.

(56) References Cited

U.S. PATENT DOCUMENTS

| | | | |
|---|---|---|---|
| 8,929,861 B2 | 1/2015 | Carbonell Duque et al. | |
| 9,269,207 B2 | 2/2016 | Fyke et al. | |
| 9,397,838 B1* | 7/2016 | Chen | H04L 9/3263 |
| 9,554,277 B2 | 1/2017 | G et al. | |
| 2010/0162370 A1* | 6/2010 | Altay | G06F 21/335 |
| | | | 726/5 |
| 2012/0280783 A1* | 11/2012 | Gerhardt | G07C 9/00309 |
| | | | 340/5.6 |
| 2014/0365781 A1 | 12/2014 | Dmitrienko et al. | |
| 2015/0170448 A1 | 6/2015 | Robfogel et al. | |
| 2015/0280786 A1 | 10/2015 | Bhat | |
| 2016/0125209 A1 | 5/2016 | Meyers | |
| 2016/0198287 A1 | 7/2016 | Hulusi | |
| 2017/0017947 A1 | 1/2017 | Robinton et al. | |
| 2018/0026799 A1* | 1/2018 | Pottier | H04L 9/3265 |
| | | | 713/156 |
| 2018/0102009 A1* | 4/2018 | Belhadia | E05B 47/0615 |
| 2018/0122166 A1* | 5/2018 | Singh | G07C 9/00071 |

FOREIGN PATENT DOCUMENTS

| | | |
|---|---|---|
| EP | 3179758 A1 | 6/2017 |
| WO | 2017076662 A1 | 5/2017 |

OTHER PUBLICATIONS

"NFC tag with user authentication", Stackoverflow.com, Aug. 9, 2012, https://stackoverflow.com/questions/11875393/nfc-tag-with-user-authentication (2 pp.).

Aarnio, Tomi, "Near Field Communication Using NFC to unlock doors", Master's Thesis, Espoo, Aalto University, School of Science, Degree Programme of Computer Science and Engineering, Nov. 15, 2013, (61 pp.).

Dmitrienko, Alexandra, et al., "SmartTokens: Delegable Access Control with NFC-enabled Smartphones", Available: https://eprint.iacr.org/2012/187.pdf, Accessed Nov. 15, 2017 (23 pp.).

Profis, Sharon, "The Most Practical, Creative Ways to Use NFC with your Android Device", CNet.com, Jul. 25, 2012, https://www.cnet.com/how-to/the-most-practical-creative-ways-to-use-nfc-with-your-android-device/ (5 pp.).

* cited by examiner

EXTENDED INSTANT GUEST ACCESS USING NEAR FIELD COMMUNICATION TAGS

CROSS-REFERENCE TO RELATED APPLICATIONS

This counterpart application claims the benefit of India Application No. 201711033283 filed Sep. 20, 2017, which is incorporated herein by reference in its entirety.

TECHNICAL FIELD

Embodiments relate generally to applications for use and access to a building space protected by a lock. More particularly, to registration and identification of a user and a second user and providing a second user access to the building space.

DESCRIPTION OF RELATED ART

In the hospitality industry, enhancing customer satisfaction is a priority. Faced with increased industry competition, many hotel operators are looking for smarter ways to maximize customer satisfaction, improve customer services, and generate more revenue from their properties. Expanding how hotel customers access available services has proven to be a successful strategy for many hotels. Such services may include reserving a room, reserving a taxi, reserving a conference room, selecting from digital content available via a television, reserving a game room or game console, making a spa appointment, ordering food, making travel reservations, reserving a hospitality suite, requesting room service, or a combination thereof.

By way of a non-limiting example, electronic devices such as televisions, controllers user computers, user mobile devices, tablets, and the like play an important role in providing interfaces and implementing services for guests. Likewise such devices facilitate providing such services and generating revenues. Users are increasingly using a variety of apps on their personal mobile devices to access building spaces, define preferences, investigate, request, pay for and receive services. However, such services may require a different app for each service requested which can become cumbersome and burdensome.

To gain access or receive services, particularly in a hospitality environment, hotel guests or residents in multiple residence properties generally use keys or keycards. Typically, when a patron checks into a hotel property, they are given a key or keycard to access their room, and possibly elevators, and other facilities such as the pool or gym. In the case of the keycard, the magnetic strip or RFID chip on the card is written by the hotel's front desk to include the patron's room, and check-in and check-out dates. Additionally, the key may include other information about the patron, including other access privileges. Unfortunately a keycard based security system typically requires that a patron check-in at the front desk upon arrival to be issued their keycard. The front desk must spend time and effort to program keycards for each patron, and likewise must spend efforts to retrieve and reuse keycards after a patron's visit.

In recent years, near field communication (NFC) was developed. NFC works only in the range of a few inches. NFC is a set of standards for smartphones, and other mobile devices, such as tablet computers and MP3 players, to establish radio communication with each other by bringing them into close proximity. Not only can NFC active devices communicate with each other, communication is also possible between an NFC device and an unpowered NFC chip, called an NFC tag employing well establish standards.

A long-time goal of the hospitality industry has been a way for guests to bypass the front desk and go directly to their assigned room at check-in. Further, it would be advantageous to provide ways for guests to enable access to the building space when remote or to enable access for third parties with selected credentials. Likewise, in the vacation rental market, there is a similar problem in that there is no front desk or other onsite staff available to greet the renter. Keys are sometimes left under the mat, or with a neighbor. In both cases, there is a need for a system which uses a device already in the possession of the prospective guest or renter, which can be programmed remotely with guest information, and which maintains the security of keys or keycards.

BRIEF SUMMARY

Described herein in an embodiment is a method of extending user access to a guest in a building space in a building system including at least one of a cloud computing environment and a control device associated with the building system to execute the method. The method includes receiving a request for access to a building space, the request associated with providing access to the building space for the guest, the request including a unique identifier associated with the building space, notifying a user associated with the building space of the request and requesting an authorization to provide the access to the building space, and receiving an authorization from the user associated with permitting the guest access to the building space associated with the unique identifier. The method also includes transmitting the authorization to the guest and permitting access to the building space associated with the unique identifier based on the authorization.

In addition to one or more of the features described above, or as an alternative, further embodiments may include communicating with an app executing on a first user device configured to permit a user to preselect desired access rights associated with at least one of a guest and the building space.

In addition to one or more of the features described above, or as an alternative, further embodiments may include communicating with an app executing on a second user device configured to permit a guest to communicate credential information with the request.

In addition to one or more of the features described above, or as an alternative, further embodiments may include that the request is made by communicating from a communication device to the second user device.

In addition to one or more of the features described above, or as an alternative, further embodiments may include that the communicating includes the unique identifier for the communication device associated with the building space.

In addition to one or more of the features described above, or as an alternative, further embodiments may include that the communication device is a Near Field Communication (NFC) device.

In addition to one or more of the features described above, or as an alternative, further embodiments may include that the notifying includes the at least one of the cloud computing environment associated with the building system and the control device associated with the building system, communicating with a least the first user device, the communicating including identification of at least one of the guest and the building space.

In addition to one or more of the features described above, or as an alternative, further embodiments may include that the authorization includes constraints on access permissions of the guest.

In addition to one or more of the features described above, or as an alternative, further embodiments may include that the constraints are based on at least one of the input of the user and the constraints on the user from the building system.

In addition to one or more of the features described above, or as an alternative, further embodiments may include that the building system is a hotel and the building space is an access controlled space in the hotel.

In addition to one or more of the features described above, or as an alternative, further embodiments may include providing a notification to the user via the user device regarding the access of the guest to the building space.

In addition to one or more of the features described above, or as an alternative, further embodiments may include that the receiving a request includes a communication device communicating with at least one of a cloud computing environment associated with the building system, a control device associated with the building system, and a user device of the guest, the communicating including the unique identifier and information associated with the building space in the building system, and wherein the building system employs the unique identifier to identify the building space to which access is desired.

In addition to one or more of the features described above, or as an alternative, further embodiments may include that the request for access includes presenting a credential of the guest for authentication.

In addition to one or more of the features described above, or as an alternative, further embodiments may include that the credential includes at least one of an identification of the guest an identification of the user device of the guest, an identification of the control device associated with the building space in the building system, a biometric, and a password.

In addition to one or more of the features described above, or as an alternative, further embodiments may include that the authorization further includes at least one of a cloud computing environment and a control device associated with the building system authenticating the credential and communicating an indicia of authentication to the user device of the guest.

In addition to one or more of the features described above, or as an alternative, further embodiments may include that the indicia of authentication is at least one of a message, a token, a digital certificate, and a password.

In addition to one or more of the features described above, or as an alternative, further embodiments may include that the authenticating includes validating a biometric.

In addition to one or more of the features described above, or as an alternative, further embodiments may include that the cloud computing environment and controller associated with the building system includes a local server.

In addition to one or more of the features described above, or as an alternative, further embodiments may include that the building system is at least one of a security system, access control system, and a vehicle and the control device is a lock.

In addition to one or more of the features described above, or as an alternative, further embodiments may include that the permitting access to the building space includes communicating information associated with the authentication to a controller associated with the building space in the building system.

In addition to one or more of the features described above, or as an alternative, further embodiments may include that the information associated with the authentication includes permissions associated with the permitting, the permissions including at least one of a duration associated with the permitting control, limitations on controllable features of the control of the selected controllable device, and operational parameters of the second building system to be controlled.

Also described herein in an embodiment is a system for permitting guest access to a building space in a building system. The system includes a building system having a building space associated therewith, the building system includes at least one of a controller associated with the building system and a cloud computing environment associated with the building system, and at least one communication device in operable communication with the user device of a guest, the at least one communication device associated with a unique identifier. The building system includes an application configured to be executed on a user device in operable communication with the at least one of the controller associated with the building system and the cloud computing environment associated with the building system, the user device executing the application facilitating authorizing access to a selected building space in the building system and configured to communicate a request for access to the at least one of the controller associated with the building system and the cloud computing environment associated with the building system, where at least one of the controller associated with the building system and the cloud computing environment associated with the building system are configured to execute a method of providing guest access to a building space. The method includes notifying a user associated with the building space of the request and requesting an authorization to provide the access to the building space, receiving an authorization from the user associated with permitting the guest access to the building space associated with the unique identifier, transmitting the authorization to the guest, and permitting access to the building space associated with the unique identifier based on the authorization.

Also described herein in yet another embodiment is a system for permitting guest access to a building space associated with a building system controlled by a user having an access control system, the access control system including at least one of a cloud computing environment associated with the building system and a control device associated with the building system. The system includes means for receiving a request for access to the building space, the request associated with providing access to the building space for the guest, the request including a unique identifier associated with the building space, means for notifying the user associated with the building space of the request and requesting an authorization to provide the access to the building space, and means for receiving an authorization from the user associated with permitting the guest access to the building space associated with the unique identifier. The system also includes means for transmitting the authorization to the guest and means for permitting access to the building space associated with the unique identifier based on the authorization.

Additional features and advantages are realized through the techniques of the present disclosure. Other embodiments and aspects of the disclosure are described in detail herein.

For a better understanding of the disclosure with the advantages and the features, refer to the description and to the drawings.

BRIEF DESCRIPTION OF THE DRAWINGS

The subject matter which is regarded of the described embodiments is particularly pointed out and distinctly claimed in the claims at the conclusion of the specification. The foregoing and other features, and advantages of the described embodiments are apparent from the following detailed description taken in conjunction with the accompanying drawings in which:

DETAILED DESCRIPTION

Figure 1:
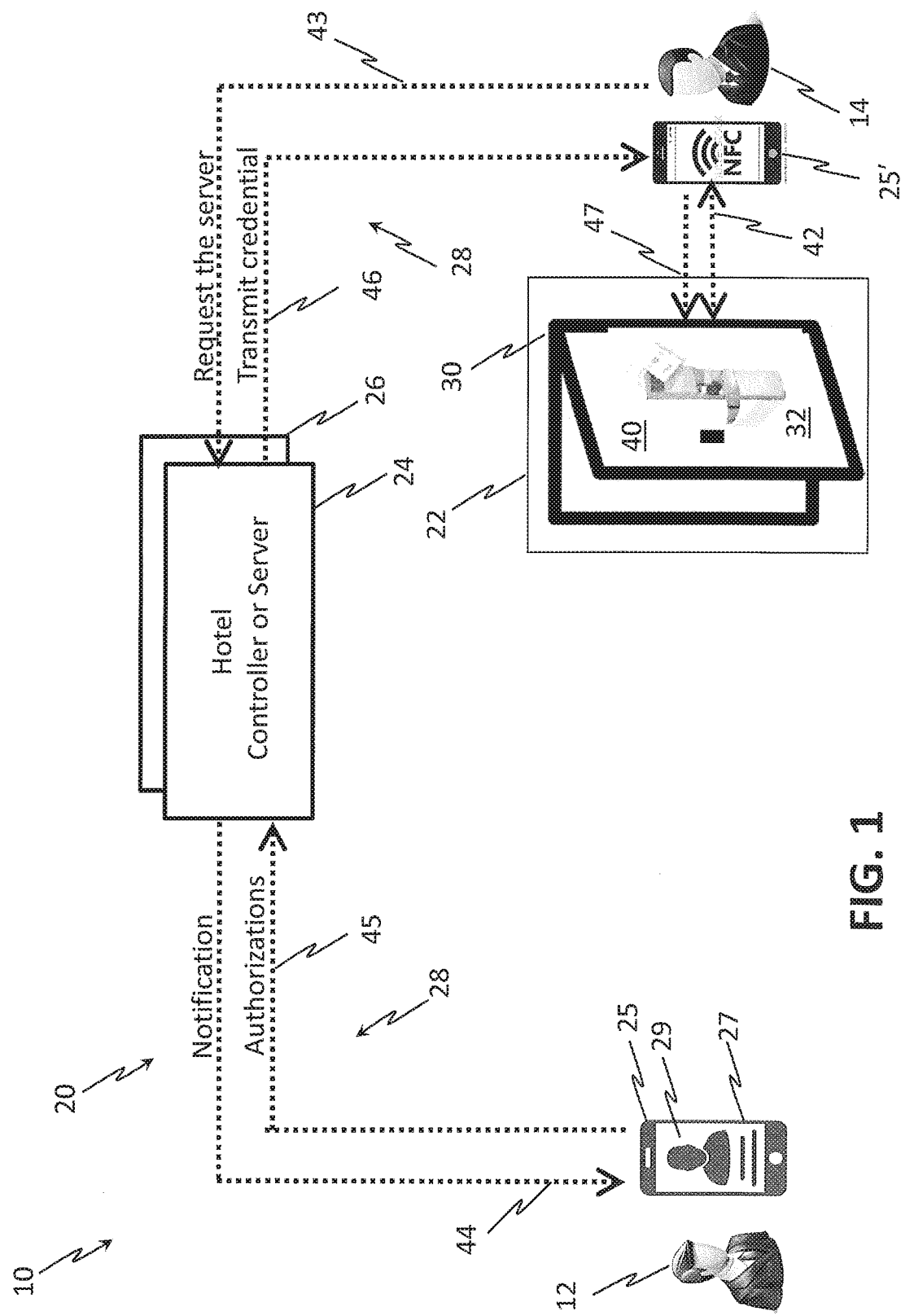
FIG. 1 depicts a simplified diagrammatic view of the system and interfaces for implementing the methodology of extended key access using NFC tags in accordance with an embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Embodiments related to a method requesting, permitting and granting permissions to a person to access a building space, e.g., a controlled space such as a room where the request for access is immediate, the person "requestor" requesting access may not be known, at least initially prior to the request, and a user who grants access may not necessarily be in the controlled building space at the time of the request for access. The user may be a hotel guest or a person who is currently in control of the space, even for a short time period, for example during a hotel stay. And, for example, the requestor may be a person seeking access to the user's hotel room to provide a service such as making a delivery. Further, the requestor may access the space via one or more NFC enabled communication devices or cards. Another feature of the described embodiments is to enable hospitality and (B2B) industries to provide services/facilitate access for services providers for the user, potentially in advance of their arrival or without their presence. In addition, building space staff, e.g., hotel management or staff, or a person requesting access may do so without a physical interruption as would typically be required today, for example to answer a door.

Referring now to the drawings, FIG. 1 illustrates a diagrammatic overview of a system 10 for extended instant key access using NFC tags in a system 10 in a business environment, in particular, for example, a hospitality environment. In an embodiment the system 10 includes a building system 20 associated with a first building space 22. For example, an office or room in a hotel, conference room, recreational vehicle, car, and the like, or any other building space 22 that may be access controlled. In application, this building space 22 would be one that the user 12 e.g., a hotel patron, employs occasionally or perhaps even only once. For example, the building space 22 may be an office space or hotel room having a security system or access control system, e.g. lock system securing an access point 30, e.g., a door, gate and the like, hereinafter referred to as a door 30 for simplicity. In an embodiment the access point 30 is a room door in a hotel and the access is controlled by a lock 32. Each of these building systems 20 may include a controller 24 that is employed to interface to the building system 22 and execute processes to control the building system 20. In an embodiment, the controller 24 may be the lock 32. In another embodiment, the controller 24 may include a local or remote server that operates as the controller 24 for the building system 20. In addition, some, or all of the functionality provided by the controller 24 to control the building system 20 may be based on methods and processes executed remotely such as on a local or remote server or cloud computing environment 26. As will be appreciated the cloud computing environment 26 could include a local or remote server, or the system 20 and cloud computing environment 26 could be entirely remote. The building system 20 may also include a local and remote communication network and system, shown generally as 28 for facilitating communication and control of various features in the building system 20 as well as for facilitating communication between a user device 25, controller 24, and the server or cloud computing environment 26. Likewise, the building system 20 may also include an application (app) 29 operable on the user device 25, that permits and facilitates the user to enter and receive information and for user device 25 to communicate with, interface with, and control selected aspects of building system 20. The app 29 and the user device 25 may include a user interface 27 to enable the user 12 to interface with the user device 25 and the app 29 being executed thereon. In an embodiment, the app 29 may be employed by the user 12, for example to facilitate user authentication and access permissions to the building system 20. The app 29 may also facilitate establishing user preferences associated with the building system 20, and more particularly the building space 22 (e.g. facility or room).

Cloud computing is a widely adopted and evolving concept. Generally, cloud computing refers to a model for enabling ubiquitous, convenient, and on-demand access via Internet to shared pools of configurable computing resources such as networks, servers, storages, applications, functionalities, and the like. There are a number of benefits associated with cloud computing for both the providers of the computing resources and their customers. For example, customers may develop and deploy various business applications on a cloud infrastructure supplied by a cloud provider without the cost and complexity to procure and manage the hardware and software necessary to execute the applications. The customers do not need to manage or control the underlying cloud infrastructure, e.g., including network, servers, operating systems, storage, etc., but still have control over the deployed applications. On the other hand, the provider's computing resources are available to provide multiple customers with different physical and virtual resources dynamically assigned and reassigned according to clients' load. Further, cloud resources and applications are accessible via the Internet.

Figure 2:
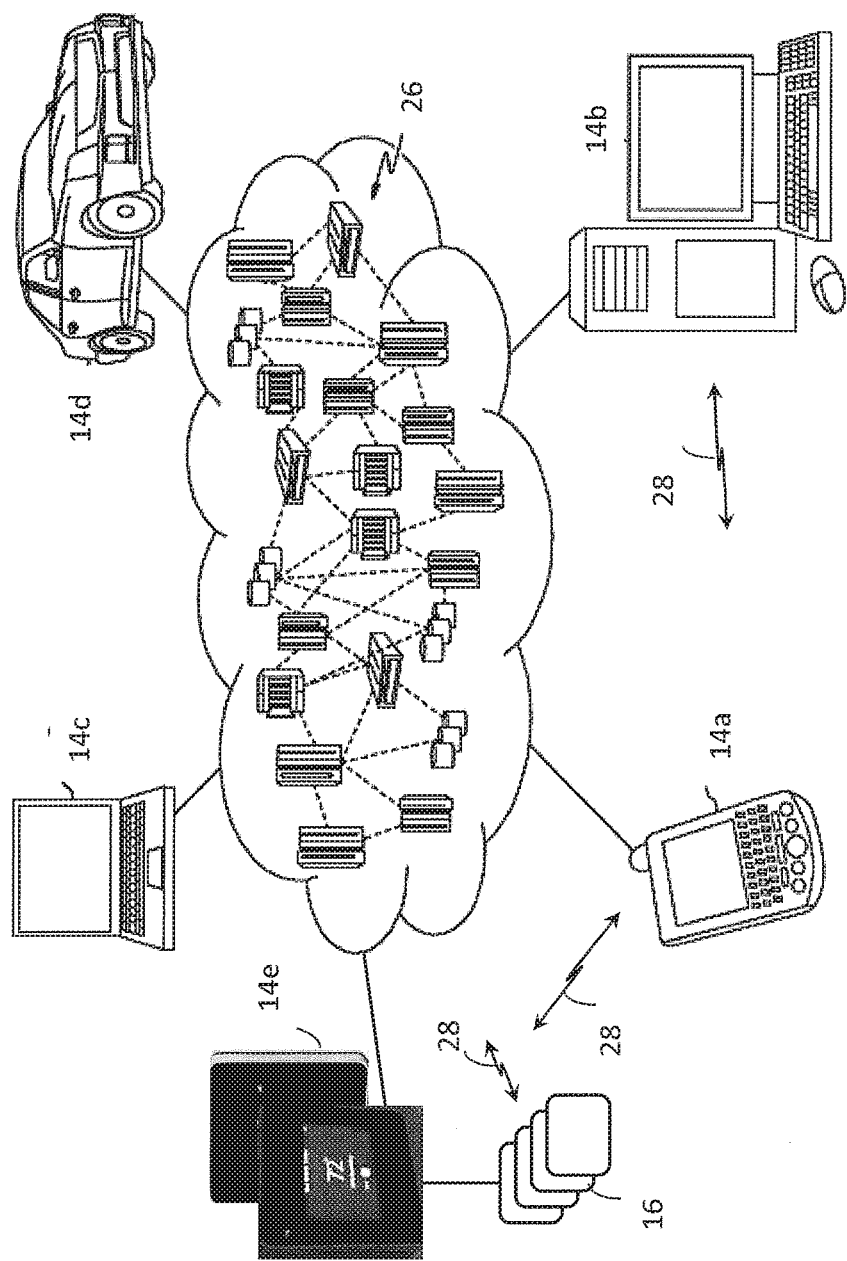
FIG. 2 is a depiction of a cloud computing environment as may be employed in accordance with an embodiment.

Referring now to FIG. 2, an illustrative cloud computing environment 26 is depicted. As shown, cloud computing environment includes one or more cloud computing nodes, such as communication nodes or servers 26 (FIG. 1), with which computing devices and controllers 14*a-e* may communicate. Cloud computing nodes 26 may communicate with one another and/or be grouped (not shown) physically or virtually, in one or more networks, such as Private, Community, Public, or Hybrid clouds, or in one or more combinations thereof. This allows cloud computing environment to offer infrastructure, platforms and/or software as services for which a cloud consumer does not need to maintain or minimize resources at a local computing device level. It is understood that the types of computing devices 14 shown in FIG. 2 are intended to be illustrative only and that computing nodes such as 26 and cloud computing environment can communicate with any type of computerized device over any type of network and/or network addressable connection (e.g., using a web browser).

The computing devices 14*a-e* such as user device 25 may be any form of a mobile device (e.g., smart phone, smart watch, wearable technology, laptop, tablet, etc.). The user device 25 can include several types of devices, in one instance, even a fixed device, e.g. a keypad/touch screen affixed to a wall in a building corridor/lobby, such as building system controllers 24. In other words, the controller 24 and the user device 25 can all be computing devices 14*a-e*. It should be appreciated that the system controllers 24 are typically part of the installed building system infrastructure, while the third user device 25 is typically owned and used by the user, service man, homeowner, and the like. The term "user device" 25 is used to denote all of these types of devices as may be employed by the user for the purposes of communication with the building system 20. It should be appreciated that in some instances a user device 25 or the controller 24 are proximate to the system(s) 20, for example, a thermostat or system control unit, in others they are mobile for example, a car, PDA, or movable kiosk. For example, in an embodiment, the computing devices could be, a personal digital assistant (PDA) or cellular telephone tablet 14*a*, such as user device 25, desktop computer/terminal/server 14*b*, laptop computer 14*c*, a vehicle 14*d*, or a security or access control panel/HVAC thermostat 14*e*, such as controller 24. Computing devices 14*a-e* may also be configured to communicate with each other or a variety of sensors 16. The communication with other computing devices 14*a-e* or sensors 16 could be wired or wireless as needed. The computing devices 14*a-e* are generally connected to and with a communication network, such as communication network 28 such as local area network (LAN), wide area network (WAN) or cellular, and the like, to facilitate communication with and between computing devices or controllers 14*a-e* and the cloud computing nodes 26 as will be described further below.

The computing devices, 14*a-e* such as user device 25, as well as other components of the system 20 including building system controller 24 can communicate with one another, in accordance with the embodiments of the present disclosure, e.g., as shown in FIG. 1. For example, one or more user devices 25 and controller 24 may communicate with one another when proximate to one another (e.g., within a threshold distance). The user device 25 and controller 24 may communicate over one or more networks 28, (e.g., a communication bus) that may be wired or wireless. Wireless communication networks can include, but are not limited to, Wi-Fi, short-range radio (e.g., Bluetooth®), near-field (NFC), infrared, cellular network, etc. In some embodiments, controller 24 may include, or be associated with (e.g., communicatively coupled to) one or more other networked building elements (not shown), such as computers, beacons, other system controllers, bridges, routers, network nodes, etc. The networked elements may also communicate directly or indirectly with the user devices 25 using one or more communication protocols or standards (e.g., through the network 28). For example, the networked element such as tag 40 may communicate with the user device 25 using near-field communications (NFC) and thus enable communication between the user device 25 and building system control unit 24, or any other components in the system 10 when in close proximity to the user device 25 (NFC is a short range wireless protocol). Or, for example, the networked element 40 may communicate with the user device 25 using Bluetooth and thus communicate a unique id and enable communication between the user device 25 and building system control unit 24 or any other components in the system 10 from a further distance. The network 28 may be any type of known communication network including, but not limited to, a wide area network (WAN), a local area network (LAN), a global network (e.g. Internet), a virtual private network (VPN), a cloud network, and an intranet. The network 28 may be implemented using a wireless network or any kind of physical network implementation known in the art. The user devices 25 and/or the computing devices may be coupled to the controller 24, through multiple networks (e.g., cellular and Internet) so that not all user devices 25 and/or the computing devices are coupled to the any given controller 24 or component through the same network 28. One or more of the user devices 25 and the controller 24 may be connected in a wireless fashion. In one non-limiting embodiment, the network 28 is the Internet and one or more of the user devices 25 executes a user interface application (e.g. a web browser, mobile app) to contact and communicate with the system's controller 24, through the network 28.

Figure 3:
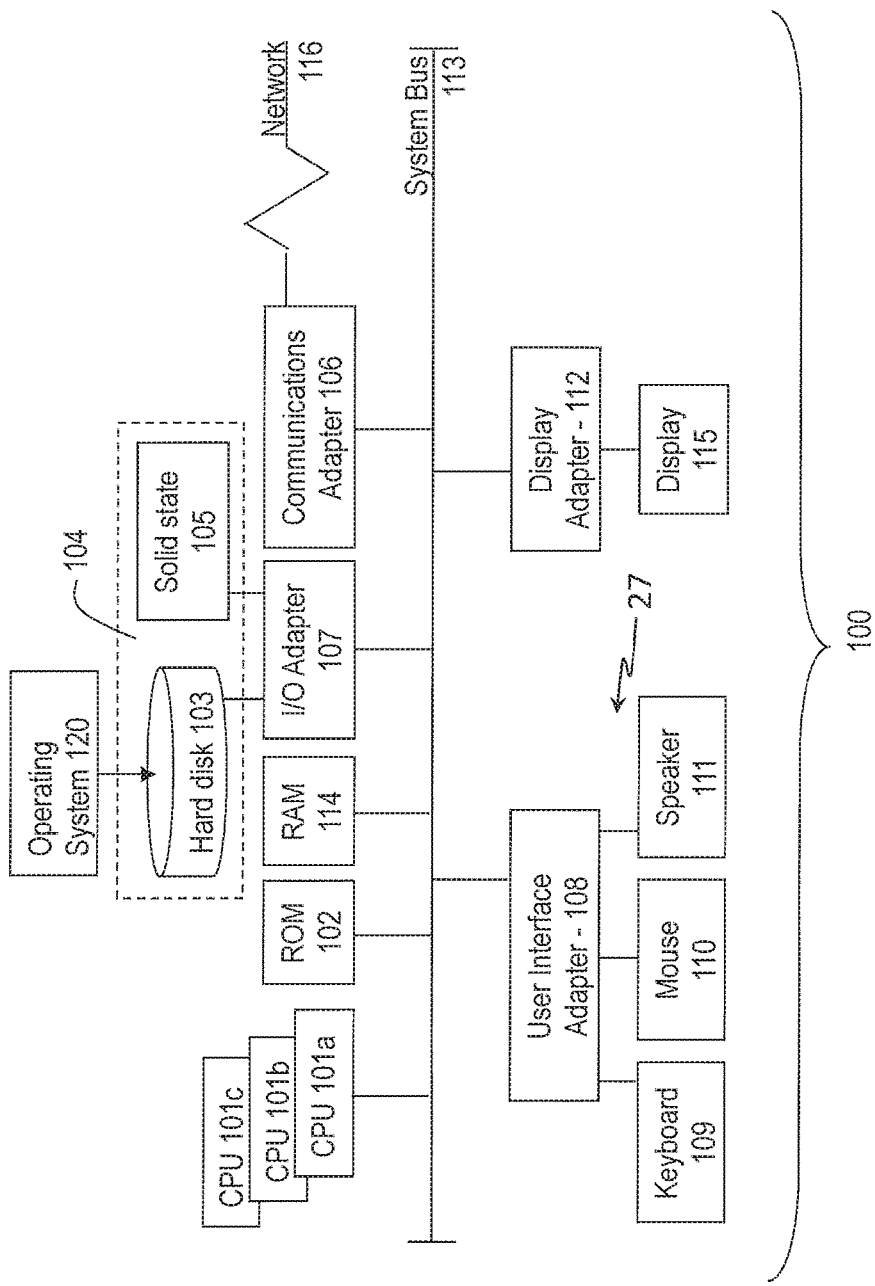
FIG. 3 depicts a simplified block diagram of a computing system as may be implemented in a user device in accordance with an embodiment.

Referring to FIG. 3, the computing devices 14*a-e*, including user device 25 and controller 24, may include a processing system including a processor, memory, and communication module(s), as needed to facilitate operation and interfacing with various components and elements of the building system(s) 20. In one embodiment, the computing devices 14*a-e*, including user device 25 and controllers 24 each may include a computing system 100 having a computer program stored on nonvolatile memory to execute instructions via a microprocessor related to aspects of communicating and controlling a building system(s) 20 and in particular executing a method for utilizing user preferences for requesting services in the building system 20 as described further herein.

In an embodiment, the computing system 100 has one or more processing units (processors) 101*a*, 101*b*, 101*c*, etc. (collectively or generically referred to as processor(s) 101). The processor 101 can be any type or combination of computer processors, such as a microprocessor, microcontroller, digital signal processor, application specific integrated circuit, programmable logic device, and/or field programmable gate array. As is conventionally done, the processors 101 are coupled to system memory 114 and various other components via a system bus 113. The memory can be a non-transitory computer readable storage medium tangibly embodied in the user including executable instructions stored therein, for instance, as firmware. Read only memory (ROM) 102 is coupled to the system bus 113 and may include a basic operating system, which controls certain basic functions of system 100. Random Access Memory (RAM) 114 is also coupled to the system bus 113 and may include a basic storage space to facilitate program execution.

FIG. 3 further depicts an input/output (I/O) adapter 107 and a network adapter 106 coupled to the system bus 113. I/O adapter 107 communicates with hard disk 103 and/or solid state storage 105 or any other similar component. I/O adapter 107, hard disk 103, and solid state storage 105 are collectively referred to herein as mass storage 104. As is conventionally done an operating system 120 for execution on the processing system 100 may be stored in mass storage 104. A network adapter 106 interconnects bus 113 with an outside network 116 such as and including communications network 28 and the like, enabling computing system 100 to communicate with other such systems. The network adapter 106 may implement one or more communication protocols as described in further detail herein, and may include features to enable wired or wireless communication with external and/or remote devices separate from the user device 25. The computing device 14*a-e* including the user device 25 and controller 24 may further include a user interface, shown generally as 27, e.g., a display screen, a microphone, speakers, input elements such as a keyboard 109 or touch screen, etc. as shown in FIG. 3) as known in the art. A screen (e.g., a display monitor) 115 is connected to system bus 113 by display adaptor 112, which may include a graphics adapter and a video controller. A keyboard 109, mouse 110, and speaker 111 all interconnected to bus 113 via user interface adapter 108. It should be appreciated that in some embodiments some or all of these elements of the computing system 100 may be integrated. In one embodiment, adapters 107, 106, and 112 may be connected to one or more I/O busses that are connected to system bus 113 via an intermediate bus bridge (not shown). Suitable I/O buses for connecting peripheral devices may also be employed Additional input/output devices are shown as connected to system bus 113 via user interface adapter 108 and display adapter 112. It should be appreciate that the components of the system as described are for illustration purposes only. Features and functions as described may be omitted, integrated, or distributed as desired and as required to suit a particular application.

Embodiments provided herein are directed to apparatuses, systems, and methods for making and fulfilling requests for services or more specifically permitting instant access to a building space 22. In some embodiments, the request for services, (herein after simply a request), and notifications and authorizations may be communicated over one or more lines, connections, or networks, such as network 28. The request may be initiated by the user device 25 and app 29 when the user holds the user device 25 close to a door lock 32 and reads a unique NFC tag 40 embedded in the door lock 32. Or the request may be initiated by reading a unique id transmitted over Bluetooth from the door lock 25. Once the app 29 has identified the unique identifier of the door lock 32, the requester 14 can initiate a request for access to the door lock 32 from the person that is the current owner or controller of the door lock 32. The request is made and transmitted through the network 28 to a cloud environment 26 or controller 24, and the like. The request may be initiated by a mobile device controlled by and/or associated with a user, e.g., user device 25 in a passive or active manner. In some embodiments, the user device 25 may be operative in conjunction with a Transmission Control Protocol (TCP) and/or a User Datagram Protocol (UDP). In some embodiments, a request may be authenticated or validated based on a location and/or identification of the user device 25. For example if the user device 25 has been registered and preauthorized.

Moreover, in some embodiments, a request may be fulfilled in accordance with one or more profiles, such as one or more user or mobile device profiles. In some embodiments the profiles may be registered as part of a registration process as part of the installation and execution the application 29 on the user device 25. As noted previously, the controller 24 may be associated with a building system (e.g., building system 20). The controller 24 and/or the cloud computing environment 26 may be used to execute the methodology described herein including communications between various devices As stated earlier, one or more of the user devices 25 may be associated with (e.g., owned by) a particular user. For example, a guest 14 with a user device 25, 25' may request service in an affirmative or active manner. The guest 14 may enter a request by tapping a NFC tag 40 as described herein or using an I/O interface of the user device 25, as described herein. That is, in some embodiments, an application, (app) 29, or other program may be installed and operated on the user device 25, 25' wherein the user and/or guest 14 may interact with the app 29 or program to initiate or facilitate a request.

Referring once again to FIG. 1, in operation, in an embodiment, a guest, family member, or service provider 14 hereinafter referred to as a guest 14 for simplicity, seeking access to the building space 22 approaches the door 30 associated with the specific building space 22 to which access is desired. The guest 14, also having the app 29 associated with the building system 20 installed on their user device 25' instead of needing to stop at the front desk of the hotel (if there is one) or knock at a the door 30, approaches the door and employs their user device 25' to tap or detect an NFC tag 40 present at the door 30 or lock 32 as depicted by line 42. The app 29 executing on the user device 25' of the guest 14 notes the detected NFC tag 40 and initiates a request to the controller 24 or server associated with the building system 20 as depicted by line 43. After the guest taps the NFC tag 40, the guest user device 25' with app 29 includes with the request 43 at least one of an identifier of the user with an guest identifier description, picture, voice memo, or with details identifying why the guest is requesting access. The guest identifier information may be auto-populated by the app 29 on the guest user device 25'. In an embodiment, each building space 22 of the building system 20 may include an NFC tag 40 having a unique ID that is mapped to the building space 22 for a given location. The mapping is registered in controller 24, server, or a cloud computing service 26. By tapping the tag 40 and reading the unique ID, the building system 20 identifies the door 30 at which the request for access is being made. It should be appreciated that while the location of the tag is described with respect to the tag 40 being located at a door 30 or lock 32, NFC tag 40 identity belongs to a building space 22, e.g., a room, and therefore, the location of the tag 40 can be anywhere. For example the tag 40 can be on door sign, door 30, lock 32, building map located on the wall and face-plate with the room name on wall with in building system 20 e.g., hotel. In fact, in some embodiments, e.g., for outside service providers and the like, the tags 40 may be located at a wall map away from the building space 22, e.g., at a front desk, or entry to include access to any intervening doors 30, elevators, and the like.

Continuing with FIG. 1, the controller 24, server, or a cloud computing service 26 employing the information communicated with the request identifies the user 12 associated with the specific building space 22 associated with the space 22 at which the request was initiated. A notification and request for authorization is presented to the user 12 for permission to access the specific building space employed by the user 12 as shown by line 44. When a user 12 receives the request, the app 29 on the user device 25 prompts the user 12 to provide access authorization to permit access to the building space 22 associated with the user 12. In an embodiment, the authorizations may be a broad e.g., yes/no type of access as might be permitted to a family member, or the authorization could be more limited or constrained by the user 12. For example, in an embodiment, the authorization may be limited in to a short duration, e.g., one day, a number of hours for visitors or guests, or even just a number of minutes. For example, when the guest 14 is a delivery person, authorization might be limited to five minutes, one time, and the like. It should be appreciated that the authorizations may also be constrained by the operator or owner of the building and building system 20. For example, in a hotel environment, the authorizations permitted may be limited based on the permissions currently available to the user. A guest 14 need not be granted access authorization that extends in duration beyond the scheduled stay of a user 12. Moreover, for security concerns, it may be desirable to limit the potential authorizations that can be granted by users 12. For example, not permitting guest access to particular locations. Moreover, if the guest 14 is a family member and is executing the app 29 it may be desirable to limit access authorizations to select building spaces 22 and the like. For example, in an embodiment, it may be desirable to limit access to a building space based on the age of the guest, and the like or prevent access to select areas such as the pool, or lounge.

Continuing with FIG. 1, as depicted by line 45, the authorizations provided by the user 12 are communicated to the controller 24 or cloud computing environment 26. In an embodiment, the authorizations identified by the user are stored in the controller 24 and/or a cloud computing service 26 associated with the building system. When a user 12 travels to a different local, and is present at a different building space 22, the selections previously established can be synced/transmitted with mobile app 29 on the user device 25 and presented as defaults along with a new request from guest 14. This will permit the user 12 to review and modify as desired as well as be provided additional localized information associated with the building space 22, as well as any potential additions. As depicted by line 45, once authorized, the controller 24 or cloud computing environment 26 associated with the building system 20 transmits a credential to the user device 25' of the guest 14. The app 29 executing on the user device 25' of the guest 14 receives the credential and as depicted at line 47, employs the credential to access the lock 32 as is accomplished in conventional access control systems. Optionally, a notification may then be provided to the user device 25 of the user 12 to indicate that the access has been provided. It should be appreciated that while the embodiments as described herein make reference to the user 12 being in the building space 22 to which a guest 14 has requested access, it should be appreciated that this is not necessary, the user could be absent or remote. The only requirement would be for the controller 24 or server and cloud computing environment 26 be able to communicate the notification as depicted with respect to line 44 and receive the authorization as depicted with respect to line 45.

Figure 4:
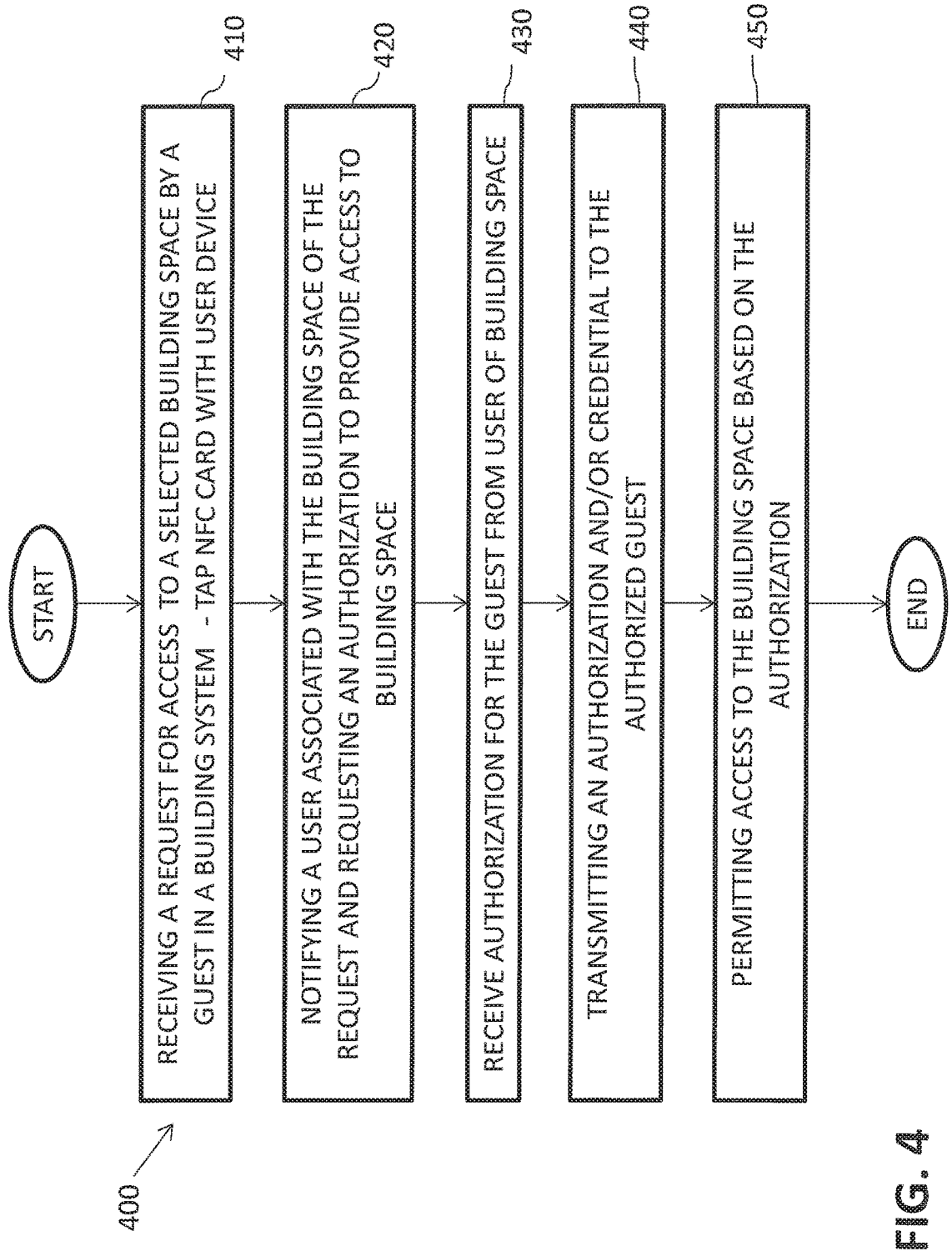
FIG. 4 depicts a flowchart of an example method of extending key access to a building space for a guest in a building system in accordance with an embodiment.

Continuing with FIG. 1, and turning now to FIG. 4, for a description of the methodology of requesting and providing access to a building space 22 in accordance with an embodiment. FIG. 4 is a flowchart depicting an example high level method 400 for requesting and providing access to a building space 22 in accordance with an embodiment. In an embodiment, the method initializes with receiving a request for access to the building space 22 by a guest 14 as depicted at process step 410 and shown by line 43 wherein the request includes a unique identifier. As described earlier, the request may be made by a guest 14 tapping a NFC tag 40 at an access point, e.g., a door 30. In an embodiment, the NFC tag 40 has a unique identifier that is recognizable by a controller 24 or cloud computing environment 26 in a building system 20. In an embodiment the unique identifier maps to a particular door 30 or access point 32 associated with a specific building space 22 in the building system 20. In an embodiment, the unique identifiers and mapping associated with building spaces 22 in the building system 20 are stored in controller 24 or the cloud computing environment 26. In another embodiment, the preferences could be passed from the cloud computing environment 26 to another cloud computing environment 26, or to the controller 24 as described herein.

Continuing with FIG. 4 and the method 400, at process step 420 the method 400 includes transmitting a notification of the request for access to a selected building space 22 associated with a user 12 to the user device 25 of that user 12 as shown by line 44. In an embodiment, the app 29 on the user device 25 may be configured to communicate with the controller 24 associated with the building system 20 or the cloud computing environment 26 to receive the notification and a request to provide an authorization for access to the identified building space 22. In one embodiment the controller 24 is a controllable device 14a-14e (FIG. 2) for the building system 20 and the access is via a local communication interface 28. In another embodiment the controller 24 is a server or cloud computing network 26 as described earlier. The app 29 operating on the user device 25 may communicate with the controller 24 and/or the cloud computing environment 26 to provide such authorization. In an embodiment, the authorization may be through another computing device 14a-e such associated with another building system such as a room lock. It will be appreciated that a user device 25 executing the app 29 associated with the building system 20 may include such authorization to ensure identification of the user and user device 25. In some embodiments the authorization includes a permission associated with the request for access (whether physical or via communications) to the building system 20 by transmission and presentation of a form of credential. For example, via the app on the user device 25' where the user device 25' is preregistered with the building system 20. Such a request may be via an app on the user device 25', or the cloud computing environment 26 associated with the building system 20. In some embodiments, the authorizing as depicted at line 45, includes validating the request for access for a guest 14 and providing access or an authorization for the communication. In another embodiment the authorizing includes a validation of the request for access and providing a token to facilitate further authenticated communications. In some embodiments the authorization and/or token is provided to the user device 25', in other embodiments the authorization/token is provided to a component of the first building system 20. In some embodiments, other techniques could be employed for authentication. For example, biometrics may be employed as a means of authenticating the guest 14 to the building space 20. This could be done by a thumbprint reading on the sensor on the user device 25' relayed to the cloud computing environment 26 or a sensor (not shown) receiving a biometric associated with a credential shared, i.e., a biometric profile or reference to a profile). The biometric could be a thumbprint or a picture of a person taken by a camera (phone's camera or other) or a voice recognition, and the like.

In some embodiments the request 43 in step 410 may include a guest's biometric (voice, face, thumbprint) as an example credential presented with the request. In an embodiment the guest's biometric is retrieved by the user device 25' and is validated before sending the request and notification to the user 12 for review and authorization. For example a picture for thumbprint verified for access to the user device 25'. In another embodiment a guest's biometric is retrieved by the user device 25' and is sent along with the request and credential and is validated/authenticated by the building system 20. For example, the biometric could be a picture that is sent with the request, the picture is then observed or compared to a picture on file for the part of the authentication or is observed by the user 12 as part of notifying a user and requesting authorization in step 420. Finally, in another embodiment, the biometric as a credential is sent along with the request to the building system 20 which then utilizes a biometric device (not shown) to read a biometric and validate that the requester e.g., guest 14 is authentic.

Further, the method 400, may complete after process step 410 and before process step 420 in a special condition where the guest 14 already has access rights to the door 30 with a door lock 32 that is identified by the request 43. Determining this special condition is performed by one of the controller 24 associated with the building system 20 or the cloud computing environment 26. In this special case, the message 46 back to the guest device 25' would include the credential already granted prior as well as an indication that the guest 14 already has permissions to open the room lock 32 and did not need to notify a request from the room owner 12 again.

Continuing with FIGS. 1 & 4 and the method 400, at process step 430 the method 400 includes the user reviewing the request for access and electing the authorization to provide as depicted by line 45. In an embodiment the authorization could be to permit access or not, and to permit the access with additional constraints. The authorization is then transmitted to the controller 24 or cloud computing environment 26 using the communications network to the controller 24 where the particular access associated with the particular tag 40 was requested as depicted at process step 440. In another embodiment, the authorization is transmitted to the user device 25'. The authorization may include a further authentication such as a password, token and the like to permit further communication and acceptance with another controller 24 or in particular a lock 32 as depicted at process step 440. At process step 450 the guest 14 presents the credential with the authentication e.g. password, token, and the like to the lock 32. The lock 32 when presented with a valid credential, accepts the credential and unlocks the lock 32 to permit access to the guest. Optionally, a notification may be provided to the user 12 via the user device 25. Notifications may include, but not be limited to an acknowledgement of the authentication and/or that the access has been provided. Moreover, a notification that the building space has actually been accessed, and the like.

The technical effects and benefits of embodiments relate to a method and system for permitting a guest access to a building space 22 in a building system 20. In one instance the building system 20 may be a hotel where a user is a patron. In addition, the guest has a smart device, e.g., mobile phone, has an app operating for interfacing to one or more systems in the hotel for example lock access. For example an app associated with verifying the guest and enabling access to the hospitality space. In operation, as part of the guest attempting to gain entry to a secured space in the hotel, the user is notified of a request from the guest and provides authentication with the user's mobile device by sending authorization to the hotel credentialing app and/or cloud environment. The authorization may typically be for a selected duration such as for just a few minutes, or from check-in to check-out for the patron. Connectivity is either through cloud or peer-to-peer. Advantageously these features will attract the customers towards specific hotels and facilities where these features are available, thus fostering brand loyalty.

The terminology used herein is for the purpose of describing particular embodiments only and is not intended to be limiting of scope and breadth of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the described embodiments in the form disclosed. Many modifications and variations will be apparent to those of ordinary skill in the art without departing from the scope and spirit of the claims. The embodiments have been chosen and described in order to best explain the principles of the inventive concept and the practical application, and to enable others of ordinary skill in the art to understand the scope and breadth of the claims and the various embodiments with various modifications as are suited to the particular use contemplated.

What is claimed is:

1. A method of extending a user's access control permissions to a guest in a building space in a building system having an access control system, the access control system including at least one of a cloud computing environment associated with the building system and a control device associated with the building system executing the method, the method comprising:
receiving a request for access to a building space at a first user device, the requested initiated at a second user device by the guest seeking access to the building space in the building system, wherein the building space is at least a portion of the building system, the request associated with providing the guest access to the building space in the building system, the request including a unique identifier associated with the building space;
notifying a user associated with at least the building space of the request and requesting an authorization from the user to provide the access to the building space, wherein the user is an individual having an existing set of granted access control permissions associated with at least the building space in the building system;
receiving an authorization from the user associated with permitting the guest access to the building space associated with the request and the unique identifier;
transmitting the authorization to the guest, the authorization including a credential configured to provide access to the building space, the credential stored on the second user device; and
permitting the guest access to the building space associated with the request and the unique identifier based on the authorization and the credential being presented at the building space.

2. The method of claim 1, further including communicating with an app executing on the first user device configured to permit the user to preselect desired access rights associated with at least one of a guest and the building space.

3. The method of claim 1, further including communicating with an app executing on the second user device configured to permit a guest to communicate credential information with the request.

4. The method of claim 3, wherein the request is made by communicating from a communication device to the second user device.

5. The method of claim 4, wherein the communicating includes the unique identifier for the communication device associated with the building space.

6. The method of claim 4, wherein the communication device is a Near Field Communication (NFC) device.

7. The method of claim 1, wherein the notifying includes the at least one of the cloud computing environment associated with the building system and the control device associated with the building system, communicating with a least the first user device, the communicating including identification of at least one of the guest and the building space.

8. The method of claim 1, wherein the authorization includes constraints on access permissions of the guest.

9. The method of claim 8, wherein the constraints are based on at least one of the input of the user and the constraints on the user from the building system.

10. The method of claim 1, wherein the building system is a hotel and the building space is an access controlled space in the hotel.

11. The method of claim 1, further including providing a notification to the user via the user device regarding the access of the guest to the building space.

12. The method of claim 1, wherein the receiving a request includes a communication device communicating with at least one of a cloud computing environment associated with the building system, a control device associated with the building system, and the second user device of the guest, the communicating including the unique identifier and information associated with the building space in the building system, and wherein the building system employs the unique identifier to identify the building space to which access is desired.

13. The method of claim 1 wherein the credential includes at least one of an identification of the guest an identification of the second user device of the guest, an identification of the control device associated with the building space in the building system, a biometric, and a password.

14. The method of claim 1, wherein the authorization further includes at least one of a cloud computing environment and a control device associated with the building system authenticating the credential and communicating an indicia of authentication to the user device of the guest.

15. The method of claim 14, wherein the indicia of authentication is at least one of a message, a token, a digital certificate, and a password.

16. The method of claim 14 wherein the authenticating includes validating a biometric.

17. The method of claim 1, wherein the cloud computing environment and controller associated with the building system includes a local server.

18. The method of claim 1, wherein the building system is at least one of a security system, access control system, and a vehicle and the control device is a lock.

19. The method of claim 1, wherein the permitting access to the building space includes communicating information associated with the authentication to a controller associated with the building space in the building system.

20. The method of claim 19, wherein the information associated with the authentication includes permissions associated with the permitting, the permissions including at least one of a duration associated with the permitting control, limitations on controllable features of the control of the selected controllable device, and operational parameters of the second building system to be controlled.

21. A system for permitting guest access to a building space in a building system, the system comprising:
a building system having a building space associated therewith, the building system includes at least one of a controller associated with the building system and a cloud computing environment associated with the building system;
at least one communication device in operable communication with a second user device of a guest, the at least one communication device associated with a unique identifier;
wherein the building system includes an application configured to be executed on a first user device in operable communication with the at least one of the controller associated with the building system and the cloud computing environment associated with the building system, the first user device executing the application facilitating authorizing access to a selected building space in the building system and configured to communicate a request for access initiated by the guest seeking access to the building space in the building system, wherein the building space is at least a portion of the building system to the at least one of the controller associated with the building system and the cloud computing environment associated with the building system;

wherein the at least one of the controller associated with the building system and the cloud computing environment associated with the building system are configured to execute a method of providing guest access to a building space, the method comprising:

notifying a user associated with at least the building space of the request and requesting an authorization from the user to provide the access to the building space, wherein the user is an individual having an existing set of granted access control permissions associated with at least the building space in the building system;

receiving an authorization from the user associated with permitting the guest access to the building space associated with the request and the unique identifier;

transmitting the authorization to the guest, the authorization including a credential configured to provide access to the building space, the credential stored on the second user device; and permitting the guest access to the building space associated with the request and the unique identifier based on the authorization and the credential being presented at the building space.

22. The method of claim 1, wherein the second use device obtains the unique identifier associated with the building space at least one of NFC, a BTLE beacon, and GPS coordinates.

* * * * *